Dec. 30, 1924.

J. W. REEDER

INSECT TRAP

Filed April 10, 1922

1,521,323

Inventor
John W. Reeder

By Herbert E. Smith
Attorney

Patented Dec. 30, 1924.

1,521,323

UNITED STATES PATENT OFFICE.

JOHN W. REEDER, OF SPOKANE, WASHINGTON.

INSECT TRAP.

Application filed April 10, 1922. Serial No. 551,315.

*To all whom it may concern:*

Be it known that I, JOHN W. REEDER, a citizen of the United States, residing at Spokane, in Spokane County and State of Washington, have invented certain new and useful Improvements in Insect Traps, of which the following is a specification.

My present invention relates to improvements in insect traps or destroyers, of the illuminated type, utilizing a liquid agent, as oil, for the destruction of insects, in addition to the use of an electric lamp by means of which the insects may be scorched and thus destroyed. The subject-matter of the invention is particularly adapted for use in orchards where irrigation is employed and where electricity for lighting and power is available. Thus numerous traps, which comprise or include a shallow pan and an electric lamp, are distributed at selected points over the area of the orchard, and the pans are filled with water from the irrigation channels and later provided with a film of oil. The electric lamps employed with the traps are conveniently connected by wires with the supply of electricity used for lighting and power, and the portable traps may be located as desired and equipped conveniently for use. The invention consists in certain novel combinations and arrangements of parts as will be hereinafter more fully set forth and claimed.

In the accompanying drawings I have illustrated one complete example of the physical embodiment of my invention wherein the parts are combined and arranged according to the best mode I have thus far devised for the practical application of the principles of my invention.

Figure 1:
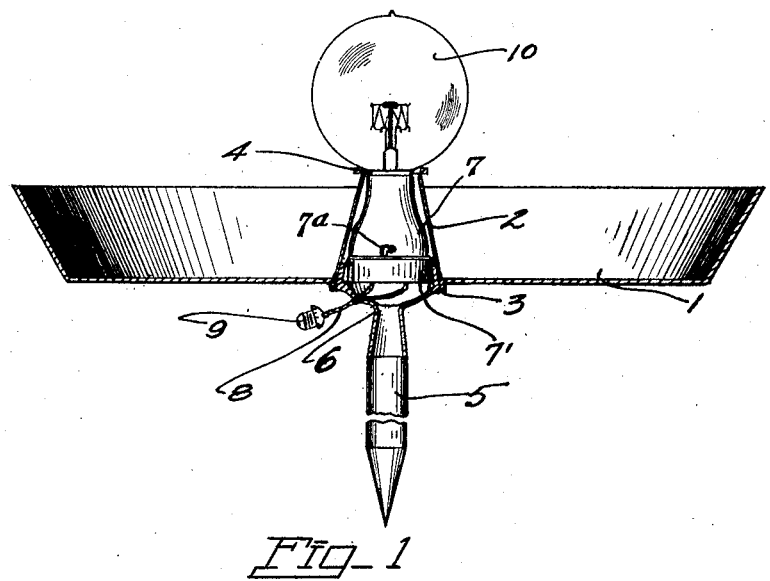
Figure 1 is a view partly in section showing an insect trap according to my invention.
Figure 2:
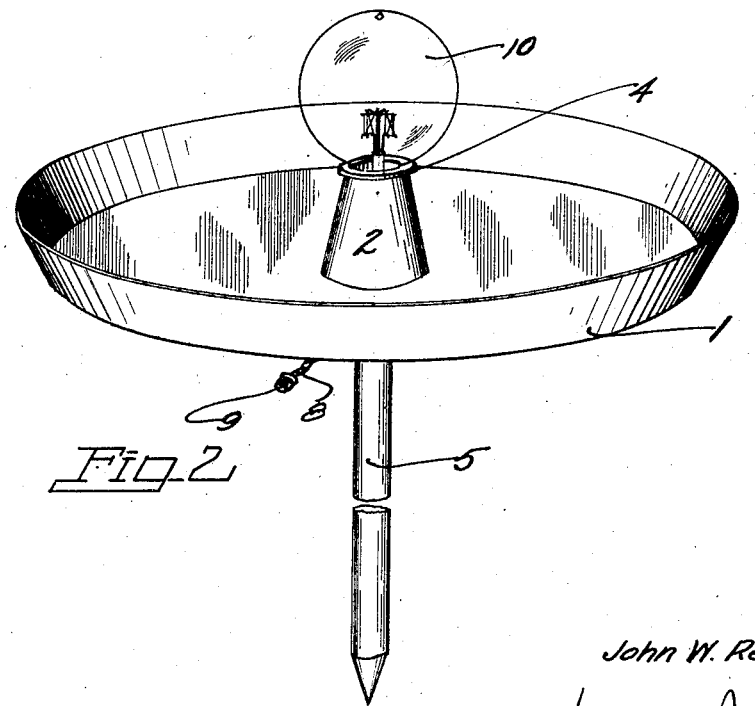
Figure 2 is a view in perspective of the insect trap.

In utilizing the device of my invention, it is the purpose to distribute and locate the required number over the area of the orchard for the protection of trees against millers, moths, and other insects, and therefore the devices are designed for convenience in transportation, facility in erecting and locating the traps, as well as for convenience in filling the receptacles with water from the irrigation channels and with a film of oil, and also for making the required electrical connections with the electric plant in the orchard.

A receptacle or shallow pan 1, preferably having sloping or tapered side walls, and circular in form is used, which may be compactly stored, or packed for transportation in quantities. Within the metal pan is secured a central frusto-conical tubular portion 2, forming a dome projecting from the bottom of the pan and above the edge of the side wall of the pan. Beneath the bottom of the pan the dome merges into an annular flange 3 which forms an extension of the base of the dome, and at its base the dome and pan-bottom are provided with a sealed or water-tight joint. The annular flange 3 is designed to shed any water that may accumulate on the bottom of the pan and thus prevent the water from coming in contact with other parts of the trap.

The top of the dome projects above the edge of the wall of the pan, and is provided with an interior, annular gasket or packing ring 4.

The pan is designed to be located at a suitable altitude above the ground and is supported upon a pointed stake 5 that may be driven into the ground to form a rigid support. At its upper end the stake is provided with a hollow metal head 6, appropriately affixed thereto and of a size to fit within the base of the dome of the pan. An electric lamp socket 7 has a holder 7' which is connected thereto by the bayonet slot and pin connection 7ª. The holder 7' is seated within the hollow open head 6, which head forms a cup shaped receptacle for the lamp holder, the usual lead wires 8 being connected as by a connection 9 with the electric wires that are run throughout the area of the orchard to be protected. In assembling the parts the holder 7' with its socket 7 connected thereto, is seated in the head 6 and then these parts are inserted in the dome 2 from below, after which the lamp bulb 10 is screwed into its socket as usual.

A powerful electric lamp of the incandescent type, as 10 is used, and located above the dome of the pan as shown. The required number of traps are distributed over the area of the orchard, and located in proper position by forcing the pointed stakes in the ground, after which the pan and lamp and its connections are applied. The pan is supported by its dome above the stake-head and the lamp is supported above the dome, the gasket 4 affording protection for the lamp against water from the pan, as well as providing a packing or cushion for the lamp in its seat. The electric wires are connected with the wiring system of the power or lighting plant, and the pans are filled to the proper height with water from the irrigation channels.

Preferably a high-power illuminating lamp is used to attract, by its bright light, the insects, and the use of a high-power lamp also provides for a heating element against which the insects, attracted by the lamp light, may strike and have their wings scorched. Over the water contained in the pan a film of oil, as kerosene, is poured, and the insects, after being attracted by the light and burned or scorched, fall into this oil film and are destroyed. The insects floating on the surface of the oil may be gathered and removed therefrom, the top of the dome performing the functions of a shield or protector to prevent water or oil from splashing or running over the top of the dome.

With a sufficient number of the traps distributed over the area of the orchard, the orchard is illuminated, the atmosphere may be temperately heated, and the flying insects may be destroyed and gathered to prevent harm to the crops. The simplicity in construction and minimum number of parts of the device, together with the inter-relation of parts whereby the devices may be packed, renders transportation, assembly, and erection of the devices a comparatively simple and facile operation.

Electrical connections to the plugs 9 may be made with facility, and when it is desired to cultivate the ground, the wires to these plugs may be quickly and conveniently disconnected and removed for such cultivation. The supply of water and oil to the pans may be replenished when required, and the arrangement of the parts prevents the possibility of short-circuiting the electric current utilized in the lamps.

Having thus fully described my invention, what I claim as new and desire to secure by Letters Patent is:—

The combination in a portable insect trap with a shallow oil pan having a frusto-conical, central, open top dome and an annular, open flange on the pan bottom at the base of the dome, of a supporting stake, a hollow head affixed to said stake and projecting within the base of the dome, a lamp socket supported in said head, an electric lamp supported from said socket above the dome, said dome having its top above the surrounding wall of the pan and a packing gasket in the top of the dome, and electrical connections for said lamp.

In testimony whereof I affix my signature.

JOHN W. REEDER.